United States Patent
Buck et al.

(10) Patent No.: US 12,414,576 B2
(45) Date of Patent: Sep. 16, 2025

(54) SYSTEM AND METHOD FOR TEMPERATURE CONTROL OF CHEWING GUM

(71) Applicant: PERFETTI VAN MELLE BENELUX BV, Breda (NL)

(72) Inventors: Ann E. Buck, Whippany, NJ (US); Bharat Jani, Whippany, NJ (US); Miles J. van Niekerk, Whippany, NJ (US)

(73) Assignee: PERFETTI VAN MELLE BENELUX BV, Breda (NL)

( * ) Notice: Subject to any disclaimer, the term of this patent is extended or adjusted under 35 U.S.C. 154(b) by 700 days.

(21) Appl. No.: 15/039,511

(22) PCT Filed: Nov. 24, 2014

(86) PCT No.: PCT/US2014/067061
§ 371 (c)(1),
(2) Date: May 26, 2016

(87) PCT Pub. No.: WO2015/081000
PCT Pub. Date: Jun. 4, 2015

(65) Prior Publication Data
US 2017/0164636 A1    Jun. 15, 2017

Related U.S. Application Data

(60) Provisional application No. 61/909,255, filed on Nov. 26, 2013.

(51) Int. Cl.
A23G 7/00    (2006.01)
A23G 4/02    (2006.01)
(Continued)

(52) U.S. Cl.
CPC ............. *A23G 7/0093* (2013.01); *A23G 4/02* (2013.01); *A23G 7/02* (2013.01); *A23G 4/20* (2013.01)

(58) Field of Classification Search
CPC .................................... A23G 7/02; A23G 4/02
See application file for complete search history.

(56) References Cited

U.S. PATENT DOCUMENTS 2,212,916 A    8/1940  Hawkins et al.
2,802,341 A    8/1957  Polk
(Continued)

FOREIGN PATENT DOCUMENTS

DE    19514917 A1    10/1996
DE    19607055 A1    8/1997
(Continued)

OTHER PUBLICATIONS

"Comparison of Heat Exchanger Types." 2011. Downloaded Apr. 23, 2020, from https://www.engineersedge.com/heat_exchanger/Camparison_heat_exchanger_types.htm.*
(Continued)

*Primary Examiner* — Stephanie A Cox
(74) *Attorney, Agent, or Firm* — Silvia Salvadori, P.C.; Silvia Salvadori

(57) ABSTRACT

Disclosed is a system for cooling chewing gum, the system including a cooling housing including a relatively upper cooling environment and a relatively lower cooling environment, a conveying device configured to convey the chewing gum from an entry point to an exit point of the cooling housing, the conveying device at least partially delimiting the relatively upper cooling environment from the relatively lower cooling environment, a first cooling system configured to provide cooling output to the relatively upper cooling environment, and second cooling system configured (Continued)

to provide cooling output to the relatively lower cooling environment, wherein the relatively upper cooling environment and the relatively lower cooling environment are disposed in fluid separation from each other.

7 Claims, 14 Drawing Sheets

(51) Int. Cl.
  *A23G 4/20* (2006.01)
  *A23G 7/02* (2006.01)

(56) References Cited

U.S. PATENT DOCUMENTS

| | | |
|---|---|---|
| 3,768,553 A | 10/1973 | Sollich |
| 3,879,954 A | 4/1975 | Cann |
| 4,276,753 A | 7/1981 | Sandberg et al. |
| 4,479,776 A | 10/1984 | Smith |
| 4,584,849 A | 4/1986 | Cloudy et al. |
| 4,626,661 A * | 12/1986 | Henke .............. F27D 7/04 219/388 |
| 4,750,276 A | 6/1988 | Smith et al. |
| 4,873,107 A * | 10/1989 | Archer .............. A21B 1/245 426/520 |
| 5,044,267 A | 9/1991 | Sollich |
| 5,168,711 A | 12/1992 | Moore et al. |
| 5,487,908 A | 1/1996 | Appolonia et al. |
| 5,970,730 A | 10/1999 | Koch et al. |
| 5,971,739 A | 10/1999 | Hoffman et al. |
| 6,148,618 A | 11/2000 | Malmberg et al. |
| 6,168,818 B1 | 1/2001 | Olkey et al. |
| 6,263,681 B1 | 7/2001 | Laut |
| 6,419,970 B1 | 7/2002 | Willcocks et al. |
| 6,427,455 B1 | 8/2002 | Furubayashi |
| 6,553,781 B2 | 4/2003 | Taylor |
| 6,865,896 B2 | 3/2005 | Kaji et al. |
| 6,912,869 B2 | 7/2005 | Lang |
| 7,197,883 B2 | 4/2007 | Gasteyer, III et al. |
| 7,202,684 B2 * | 4/2007 | Fenk ................. G01R 31/2862 165/80.3 |
| 7,823,409 B2 | 11/2010 | Colding-Kristensen et al. |
| 8,056,470 B2 | 11/2011 | Blasing |
| 8,333,087 B2 | 12/2012 | McCormick et al. |
| 2001/0011587 A1 | 8/2001 | Heyde |
| 2004/0216470 A1* | 11/2004 | Thomas ................ F25D 3/11 62/63 |
| 2005/0039608 A1 | 2/2005 | Sollich |
| 2007/0169630 A1 | 7/2007 | Auyoung |
| 2008/0057154 A1 | 3/2008 | Acar |
| 2008/0274241 A1 | 11/2008 | Steuer et al. |
| 2010/0319365 A1 | 12/2010 | Newman |
| 2011/0011097 A1 | 1/2011 | Alo et al. |
| 2011/0280993 A1 | 11/2011 | Lagares Corominas |
| 2012/0318002 A1 | 12/2012 | Jeda et al. |
| 2013/0202734 A1 | 8/2013 | Jani et al. |

FOREIGN PATENT DOCUMENTS

| | | | | |
|---|---|---|---|---|
| EP | 0797923 | A2 | 10/1997 | |
| EP | 0986966 | A2 | 3/2000 | |
| EP | 1169923 | A1 * | 1/2002 | ............. A23K 10/33 |
| GB | 882148 | A | 11/1961 | |
| GB | 887634 | A | 1/1962 | |
| GB | 901289 | A | 7/1962 | |
| GB | 997116 | A | 6/1965 | |
| GB | 1283073 | A | 7/1972 | |
| GB | 2131936 | A | 6/1984 | |
| JP | 5296640 | B2 | 9/2013 | |
| KR | 1020040082863 | A | 9/2004 | |
| RU | 2471357 | C2 | 1/2013 | |
| WO | 9962352 | A1 | 12/1999 | |
| WO | 9965324 | A1 | 12/1999 | |
| WO | 2013013041 | A2 | 1/2013 | |
| WO | 2013013045 | A2 | 1/2013 | |
| WO | 2013013046 | A2 | 1/2013 | |

OTHER PUBLICATIONS

EP Communication Pursuant to Article 94(3) EPC; Application No. 14 815 154.1-1105; Date Mailed: Mar. 12, 2018; pp. 1-6.
EP Communication Pursuant to Article 94(3) EPC; Application No. 14 815 154.1-1375; Date Mailed: Jun. 9, 2017; pp. 1-6.
JP Decision of Refusal with English Translation; Application No. 2016-550696; Date Mailed: Oct. 16, 2017; pp. 1-5.
JP Notification of Reasons for Refusal with English Translation; Application No. 2016-550696; Date Mailed: Feb. 9, 2017; pp. 1-8.
Russian Office Action with English Translation; Application No. 2016116851; Date Mailed: Sep. 14, 2017; pp. 1-13.
International Search Report; International Application No. PCT/US2014/067061; International Filing Date: Nov. 24, 2014; 7 Pages.
Invitation to Pay Additional Fees and, Where Applicable, Protest Fee; International Application No. PCT/US2014/067061; International Filing Date: Nov. 24, 2014; Date of Mailing: Feb. 25, 2015; 6 Pages.
Sollich North America; "Thermo-Flow Plus Cooling Tunnel Type LSK"; URL Accessed: http://www.sollichna.com/products/product-lines-by-sollich/thermo-flow-plus-cooling-tunnels/cooling-tunnel-type-lsk; Date Accessed: May 25, 2016; 2 Pages.
Written Opinion of the International Searching Authority; International Application No. PCT/US2014/067061; International Filing Date: Nov. 24, 2014; 13 Pages.
CN Notification of the Second Office Action with English Translation; Application No. 201480063037.7; Date Mailed: Sep. 17, 2019; pp. 1-10.
Brazilian Application No. 1120160111818 filed Nov. 24, 2014; Brazil Office Action with English Translation dated Jun. 22, 2021; 8 pages.
CN Notification of the Third Office Action with English Translation; Application No. 201480063037.7; Date Mailed: Apr. 26, 2023 (pp. 1-11).

* cited by examiner

SYSTEM AND METHOD FOR TEMPERATURE CONTROL OF CHEWING GUM

CROSS REFERENCE TO RELATED APPLICATIONS

This application is a National Stage application of PCT/US2014/067061, filed Nov. 24, 2014, which claims the benefit of U.S. Provisional Application No. 61/909,255, filed Nov. 26, 2013, both of which are incorporated by reference in their entirety herein.

FIELD

The disclosure relates generally to a system and method for temperature control of chewing gum, and more particularly to a system and method for temperature control of chewing gum that may be friable.

BACKGROUND

Conventional cooling systems and methods used for cooling chewing gum can require the chewing gum to be cooled in multiple passes in order to sufficiently cool the chewing gum. Such multiple passes may require the chewing gum to turn or bend in order to transport the chewing gum between passes. Turning or bending the chewing gum may cause possible breaking or rupturing of the chewing gum.

Accordingly, a cooling system and method that is capable of effectively cooling chewing gum that is susceptible to rupture would be desirable.

SUMMARY

Disclosed is a system for cooling chewing gum, the system including a cooling housing including a relatively upper cooling environment and a relatively lower cooling environment, a conveying device configured to convey the chewing gum from an entry point to an exit point of the cooling housing, the conveying device at least partially delimiting the relatively upper cooling environment from the relatively lower cooling environment, a first cooling system configured to provide cooling output to the relatively upper cooling environment, and second cooling system configured to provide cooling output to the relatively lower cooling environment, wherein the relatively upper cooling environment and the relatively lower cooling environment are disposed in fluid separation from each other.

Also disclosed is a method for cooling chewing gum, the method including conveying the chewing gum from an entry point to an exit point of a cooling housing via a conveying device, at least partially delimiting a relatively upper cooling environment and a relatively lower cooling environment via the conveying device, wherein the relatively upper cooling environment and the relatively lower cooling environment are disposed in fluid separation from each other, cooling the chewing gum via a first cooling system configured to provide cooling output to the relatively upper cooling environment, and cooling the chewing gum via a second cooling system configured to provide cooling to the relatively lower cooling environment.

Additionally disclosed is a system for cooling chewing gum, the system including a cooling housing, a conveying device configured to convey the chewing gum from an entry point to an exit point of the cooling housing, at least one cooling system configured to provide cooling output to the cooling housing, and a humidity control system configured to maintain a humidity level that is less than or equal to a dew point of the atmosphere within the housing or a water activity level of the chewing gum, whichever is lower.

Further disclosed is a method for cooling chewing gum, the method including conveying the chewing gum from an entry point to an exit point of a cooling housing via a conveying device, cooling the chewing gum via at least one cooling system configured to provide cooling output to the cooling housing, and maintaining a humidity level within the cooling housing that is less than or equal to a dew point of the atmosphere within the housing or a water activity level of the chewing gum, whichever is lower.

Still further disclosed is a system for cooling chewing gum, the system including a cooling housing, a conveying system configured to convey the chewing gum from an entry point to an exit point of the cooling housing, and a convective cooling system including a series of fans oriented parallel to the conveying device and configured to provide a cooling fluid flow to the chewing gum, wherein the series of fans are disposed at a height relative to chewing gum sufficient to create overlapping flow fields above the chewing gum.

Also disclosed is a method for cooling chewing gum, the method including conveying the chewing gum from an entry point to an exit point of a cooling housing via a conveying device, and cooling the chewing gum via a convective cooling system including a series of fans oriented parallel to the conveying device configured to provide a cooling fluid flow to the chewing gum, wherein the series of fans are disposed at a height relative to chewing gum sufficient to create overlapping flow fields above the chewing gum.

Additionally disclosed is a system for cooling chewing gum, the system including a cooling housing, a one-pass conveying device configured to convey the chewing gum from an entry point to an exit point of the cooling housing, and at least one cooling system configured to provide cooling output to the cooling housing, wherein the chewing gum is friable and is not conducive to turning or bending back upon itself.

Further disclosed is a method for cooling chewing gum, the method including conveying the chewing gum from an entry point to an exit point of a cooling housing via a one-pass conveying device, and cooling the chewing gum via at least one cooling system configured to provide cooling output to the cooling housing, wherein the chewing gum is friable and is not conducive to turning or bending back upon itself.

Still further disclosed is a system for cooling chewing gum, the system including a cooling housing including a relatively upper cooling environment and a relatively lower cooling environment, a conveying device configured to convey the chewing gum from an entry point to an exit point of the cooling housing, the conveying device at least partially delimiting the relatively upper cooling environment from the relatively lower cooling environment, a convective cooling system configured to provide cooling output to the relatively upper cooling environment, and a conductive cooling system configured to provide cooling output to the relatively lower cooling environment.

Also disclosed is a method for cooling chewing gum, the method including conveying the chewing gum from an entry point to an exit point of a cooling housing via a conveying device, at least partially delimiting a relatively upper cooling environment and a relatively lower cooling environment via the conveying device, cooling the chewing gum via convective cooling system configured to provide cooling output to the relatively upper cooling environment, and cooling the chewing gum via a conductive cooling system configured to provide cooling to the relatively lower cooling environment.

Additionally disclosed is a system for cooling chewing gum, the system including a cooling housing including a relatively upper cooling environment and a relatively lower cooling environment, a conveying device configured to convey the chewing gum from an entry point to an exit point of the cooling housing, the conveying device at least partially delimiting the relatively upper cooling environment from the relatively lower cooling environment, a gaseous cooling system configured to provide cooling output to the relatively upper cooling environment, and a liquid cooling system configured to provide cooling output to the relatively lower cooling environment.

Further disclosed is a method for cooling chewing gum, the method including conveying the chewing gum from an entry point to an exit point of a cooling housing via a conveying device, at least partially delimiting a relatively upper cooling environment and a relatively lower cooling environment via the conveying device, cooling the chewing gum via gaseous cooling system configured to provide cooling output to the relatively upper cooling environment, and cooling the chewing gum via a liquid cooling system configured to provide cooling to the relatively lower cooling environment.

BRIEF DESCRIPTION OF THE FIGURES

The accompanying drawings incorporated in and forming a part of the specification embodies several aspects of the present invention and, together with the description, serve to explain the principles of the invention. In the drawings.

DETAILED DESCRIPTION

Figure 1:
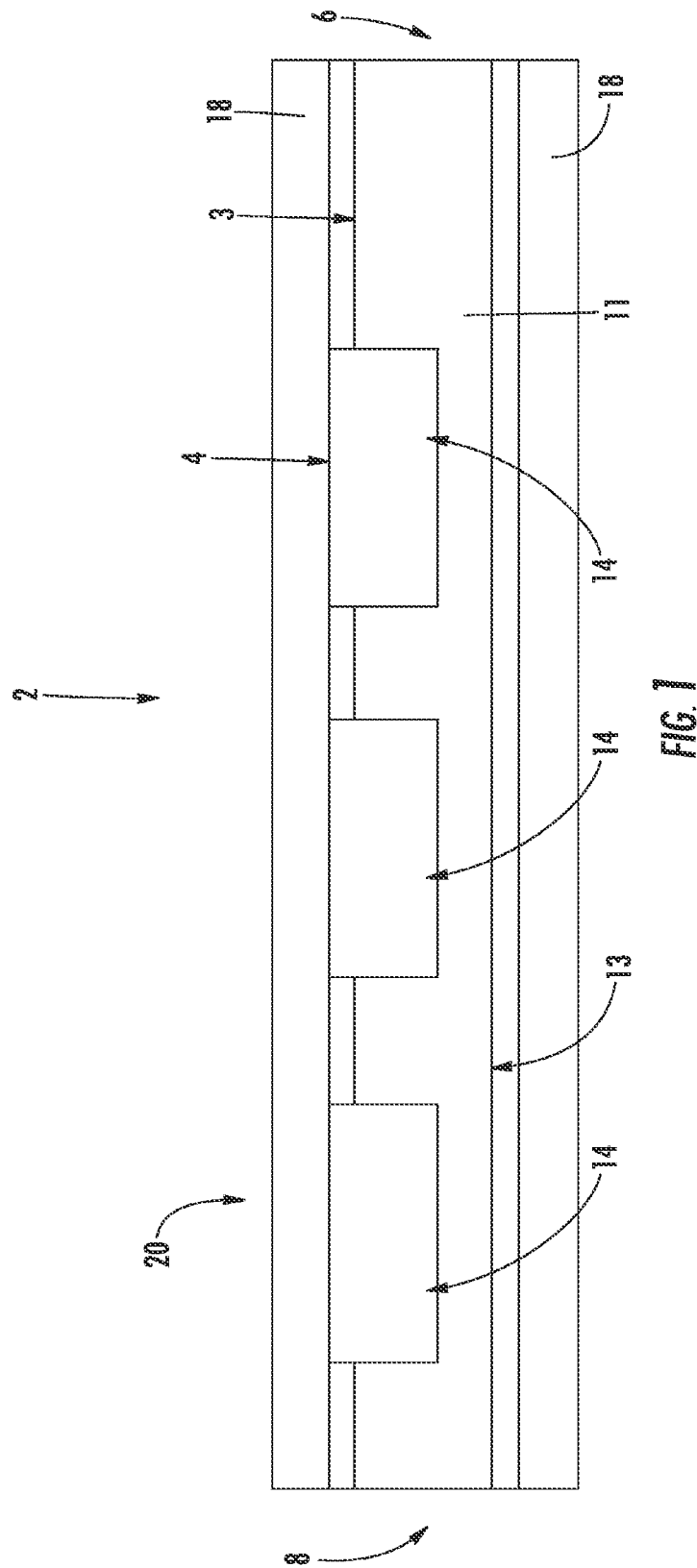
FIG. 1 is a schematic partial plan view of a cooling tunnel in accordance with an exemplary embodiment shown without the cooling housing and plenum.

The following disclosure will detail particular embodiments according to the present invention, which provides systems and methods for cooling chewing gum, particularly systems and methods for cooling chewing gum that may be friable.

Reference is now made to the drawings, wherein like reference numerals are used to refer to like elements throughout the disclosure.

Figure 2:
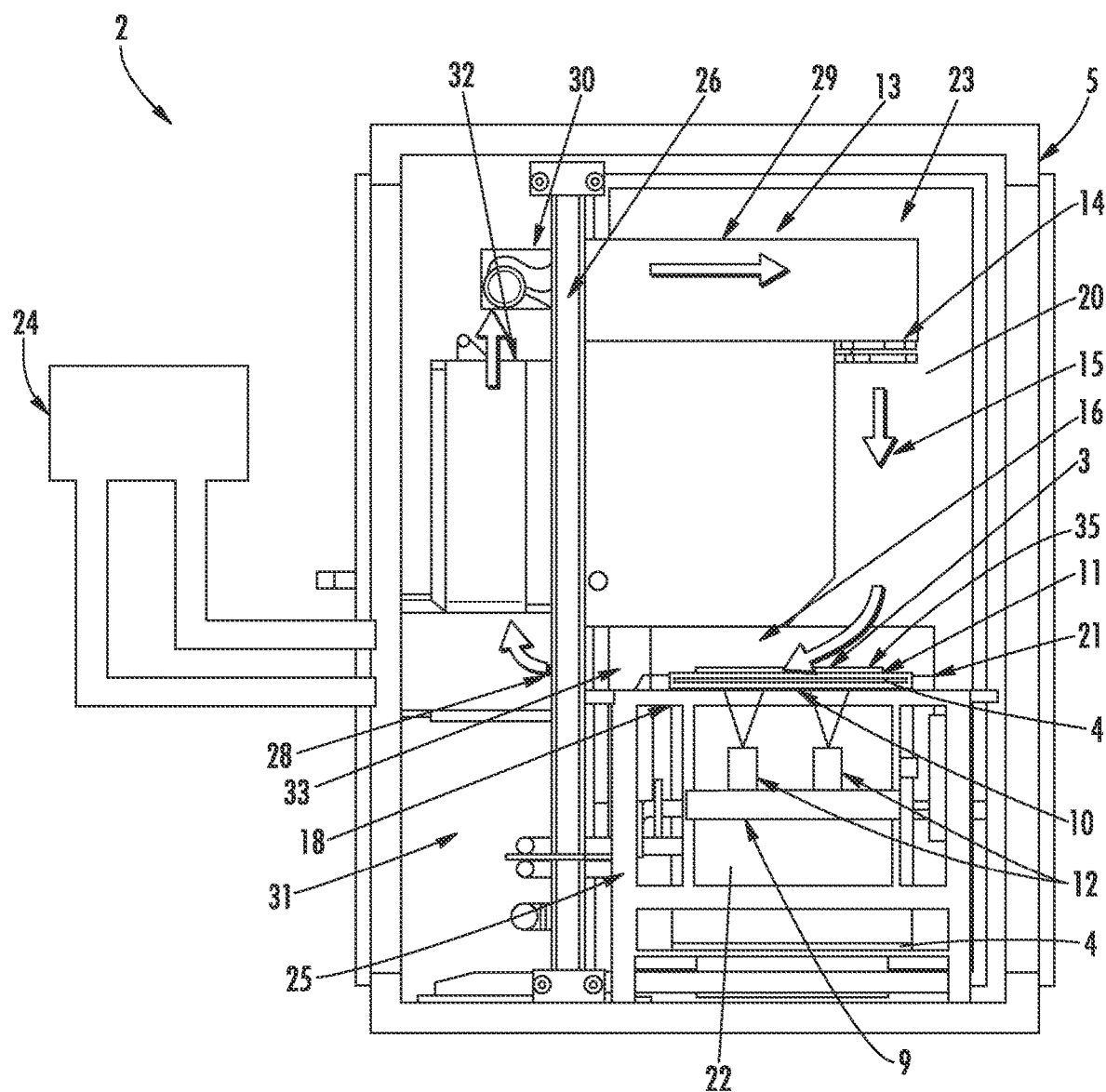
FIG. 2 is a schematic cross-sectional view of a cooling tunnel such as that shown in FIG. 1.

Referring first to FIGS. 1 and 2, a cooling system 2 for cooling chewing gum 3 is illustrated. The chewing gum 3 to be cooled in the cooling system 2 is referred to as "chewing gum" or "gum" and includes, but is not limited to, compositions ranging from and inclusive of compounded elastomer to finished gum, which may include compounded elastomer in addition to some compounding aids, master batch gum base, compounded elastomer in addition to some subsequent gum ingredients, compounded elastomer in addition to some gum base ingredients and some subsequent gum ingredients, gum base, gum base in addition to some subsequent gum ingredients, master batch finished gum, and finished gum. The chewing gum 3 may include compositions that are dusted or undusted. Undusted compositions may be desirable in order to avoid accumulation of dust in process machinery, and the process inefficiencies and reduced cooling performance that may be associated therewith. Certain compositions of chewing gum 3 may have a non-uniform texture and/or a multi-layered composition.

The cooling system 2 for cooling the chewing gum 3 includes a single pass cooling tunnel or housing 5 that, for many gum compositions and forms, cools the chewing gum 3 without subjecting the chewing gum 3 to any turns or bends. In an exemplary embodiment, the chewing gum 3 has been formed to a final thickness prior to reaching the system 2 in the form of a continuous sheet or plurality of sheets that are not conducive to turning or bending during the cooling process. Sheets of chewing gum 3 such as these may be characterized as friable or rupturable due to being sensitive or not conducive to turning or bending back upon themselves (as is likely to be experienced in multiple pass cooling systems). Such turns or bends, including turns or bends of approximately 180 degrees may cause damage, or at least may be likely to cause damage, to friable or rupturable chewing gum 3, including breakage. Further, the chewing gum 3 or sheets of chewing gum 3 may have sides that are irregular, rough, included, (e.g. with inclusions such as confections or comestibles disposed or drizzled on a surface) multi-textural, multilayered, or generally not smooth and therefore not conducive to turning or bending back upon itself. In addition to the possibility of rupture or other undesirable results caused by a turning of the sheet or sheets of gum, if a chewing gum 3 or sheet of chewing gum 3 has sides that are irregular, rough, or generally not smooth, cooling the chewing gum 3 via conventional (multi-turn, single cooling zone, convective or conductive, etc.) methods may lead to undesirable cooling performance and results.

While any chewing gum 3 that may need to be cooled before packaging or additional processing may be cooled by cooling system 2, friable, rupturable, or chewing gum otherwise sensitive to turns and bends may experience additional benefits in a cooling tunnel 2 that does not subject the chewing gum 3 to any turns or bends. As a result, chewing gum 3 may be cooled without any undesired damage, breakage, or alteration of the chewing gum 3 during the cooling process.

With the types of chewing gum 3 to be used in the cooling system 2 having be described above, the elements of the cooling system 2 will now be discussed hereinbelow. As shown in FIGS. 1 and 2, cooling system 2, includes a conveying device 4, a conductive cooling system 9, and a convective cooling system 13 that are all housed or substantially housed within the cooling tunnel 5. The conductive cooling system 9 includes fluid jets or conduits 12 that spray chilled fluid on or travel in contact with the lower surface 10 of conveying device 4 to cool chewing gum 3 via conduction. The convective cooling system 13 includes air actuation devices, such as fans 14, that may be arranged in a parallel orientation, meaning the blades of fan 14 are oriented parallel to and facing the conveying device 4, to cool chewing gum 3 via convection. The conveying device 4 and a blocking device 18 (which, as will be described below may simply be an enclosure containing or substantially containing the conductive cooling system 9) delimit and fluidly separate or substantially separate a relatively upper cooling environment 20 from a relatively lower cooling environment 22. The system 2 also includes humidity control via dehumidifier 24, which dehumidifies the air or other appropriate convective fluid of the upper environment 20.

At a relative start of a process for cooling the chewing gum 3, a continuous sheet or sheets of the chewing gum 3 is transported into the cooling system 2 by conveying device 4. The conveying device 4 may be a belt 4. A conveying device or belt 4 moves the chewing gum 3 through the cooling tunnel 5 from an entry point 6 to an exit point 8. The conveying device or belt 4 is designed to move the chewing gum 3 through the cooling tunnel 5 in one-pass, without subjecting the chewing gum 3 to any bends or turns while effectively cooling chewing gum 3.

Figure 4:
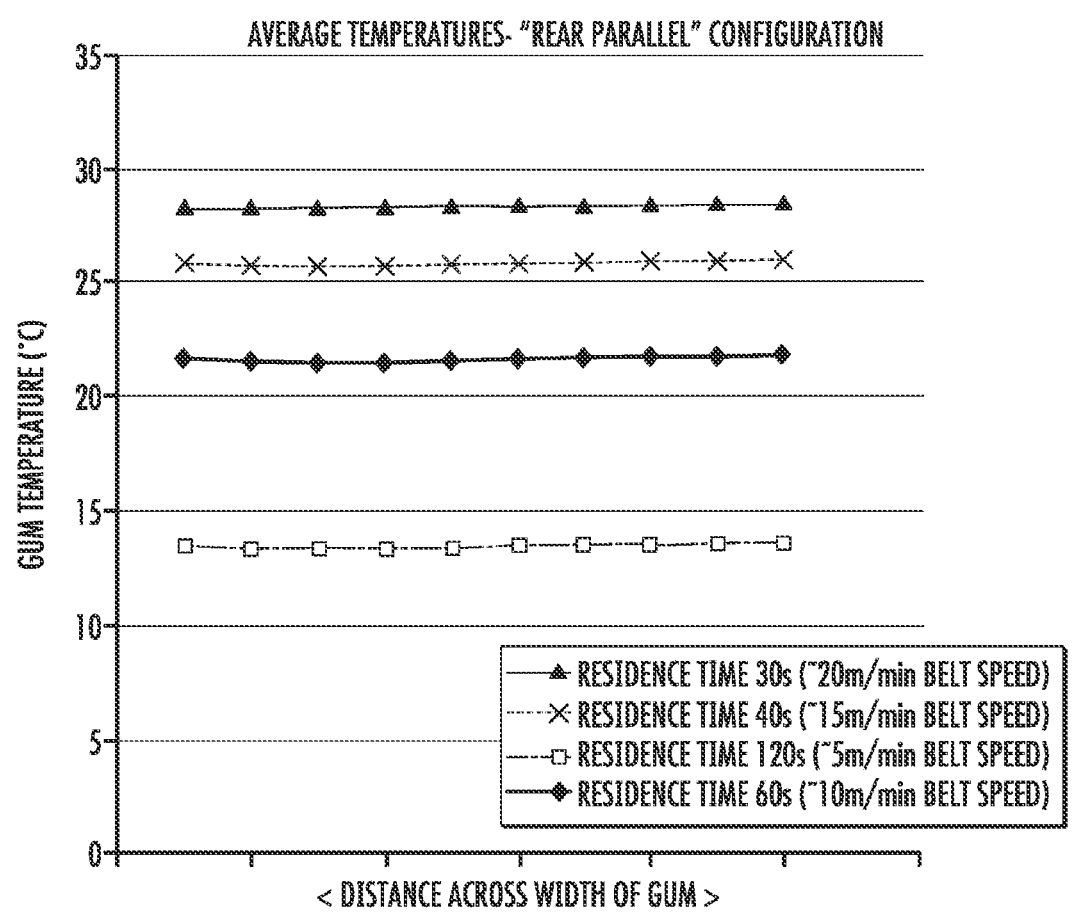
FIG. 4 is a chart comparing simulated average temperatures of chewing gum over residence times in a cooling tunnel.

The speed of the belt 4 may be varied to alter the residence time of the chewing gum 3 within cooling tunnel 5. As shown in the simulated results of FIG. 4, longer residence times within the cooling tunnel 5 may generally result in chewing gum 3 that is cooled to a lower temperature compared to chewing gum 3 that is cooled for a shorter residence time. While longer residence times may result in a lower temperature, longer residence times also cause a longer overall process time, potential process bottlenecks, and inefficiencies before and after cooling. For example, a residence time of 30 seconds resulted in an approximate average chewing gum 3 temperature of 27 to 30 degrees Celsius, specifically 28 degrees Celsius, a residence time of 40 seconds resulted in an approximate average chewing gum 3 temperature of 25 to 28 degrees Celsius, specifically 26 degrees Celsius, a residence time of 60 seconds resulted in an approximate average chewing gum 3 temperature of 20 to 23 degrees Celsius, specifically 22 degrees Celsius, and a residence time of 120 seconds resulted in an approximate average chewing gum 3 temperature of 12 to 15 degrees Celsius, specifically 13.5 degrees Celsius.

The cooling performance of the cooling tunnel 5 may be affected by the material of belt 4. The belt 4 may be made of steel or any other suitable material. The use of a highly heat conductive material, such as steel, may be beneficial for transferring heat via conduction in conjunction with the other components of conductive cooling system 9, as will be discussed in greater detail below.

The belt 4 is positioned within the housing to expose the chewing gum 3 to both conductive and convective cooling mechanisms 9 and 13 during residence of the chewing gum 3 in cooling tunnel 5. Because the conductive cooling system 9 may utilize water to remove heat from the chewing gum 3, moisture from the conductive cooling process may be introduced to the chewing gum 3 with negative consequences. Accordingly, the conductive cooling system 9 and the lower surface 10 of belt 4 is located and interfaces with a relatively lower cooling environment 22 of cooling tunnel 5, while the chewing gum 3, upper surface 11 of belt 4 and convective cooling system 13 are located and interface with a relatively upper cooling environment 20 of cooling tunnel 5.

Referring first to the conductive cooling system 9, it is noted that the fluid jets or conduits 12 may spray cooling fluid directly onto the lower surface 10 of the belt 4 (or, in the case of conduits, directly contact the lower surface 10 of the belt 4). Heat is then transferred from the chewing gum 3 to the belt 4 via conduction. When cooling chewing gum 3 that is irregular, rough, or generally not smooth, the surface of chewing gum 3 most conducive to conductive cooling is identified and placed in contact with the belt 4. The surface of the chewing gum 3 less conducive to conductive heat transfer (such as the surface including irregularities or inclusion that may be damaged by contact with conveying device 4) are placed face up on the belt 4.

As noted above, belt 4 may be constructed of a material conducive to heat transfer via conduction, facilitating conductive cooling of chewing gum 3. The effects of conductive cooling on the chewing gum 3 may dominate the cooling behavior of the chewing gum 3 compared to the effects of convective cooling. It is noted that heat transfer via conduction is dependent on available surface area facilitating conduction. As previously noted, certain compositions and certain formations of chewing gum 3 may have irregular surfaces that may not allow for optimal heat transfer via conduction. Accordingly, certain compositions and certain formations of chewing gum 3 may have a certain orientation relative to belt 4 to allow for maximum heat transfer and cooling via conduction wherein contact surface area between chewing gum 3 and belt 4 is maximized.

The heat transferred to the belt 4 by the chewing gum 3 is removed by the fluid flow introduced by fluid jet or conduit 12. The fluid introduced by fluid jet or conduit 12 may be chilled. In an exemplary embodiment, the fluid used in conductive cooling system 9 may be water. In alternative embodiments, the fluid used in conductive cooling system 9 may be, but not limited to all liquids. In at least one embodiment, the fluid temperature of the fluid introduced by fluid jet or conduit 12 is configured to be approximately the same temperature as or within 3 degrees Celsius of the convective fluid temperature of the forced fluid provided by the convective cooling system 13. Accordingly, in at least one embodiment, fluid temperature (and air temperature) and resulting belt 4 upper surface 11 temperature may range from 0 to 10 degrees Celsius or 0 to 20 degrees Celsius. The entirety of the conductive cooling system 9 may experience a wide range of temperatures. For example, contemporaneously, the fluid used in conductive cooling system 9 may range from 4 to 6 degrees Celsius, the lower surface 10 may range from 6 to 8 degrees Celsius, the upper surface 11 may range from 12 to 16 degrees Celsius, while the air provided by convective cooling system 13 within cooling tunnel 2 may be 9 degrees Celsius.

In accordance with an exemplary embodiment of the disclosure, fluid separation or substantial separation of the upper cooling environment 20 and lower cooling environment 22 may be desirable in the cooling system 2. Indeed, as is shown best in FIG. 2, the system 2 may include a conductive system enclosure 25 that facilitates and generally isolates relatively lower cooling environment 22 and conductive cooling system 9 therein from the relatively upper cooling environment 20, particularly chewing gum 3. In an exemplary embodiment, the enclosure 25 is generally defined at an upper portion by a stationary structure carrying the belt 4 and the belt 4 itself (thereby allowing the cooling jets or conduits 12 direct access to the lower surface 10 of the belt 4). As shown in FIG. 2, the enclosure 25 houses the conductive cooling system 9 and acts as the blocking device 18 that fluidly separates or substantially separates the upper cooling environment 20 and lower cooling environment 22. Though not shown in the Figures, a blocking device instead of or in addition to the enclosure 25 may also be employed in the system 2. For example, a structure such as a gasket or a seal extending laterally from inner walls of the tunnel 5 to a conveying portion of belt 4 or a stationary portion of the conveying device carrying the belt 4 may be employed as a blocking device in addition to or instead of the enclosure 25. Such a structure may be formed of rubber, metal, polymer, or any other suitable material. In any event, the blocking device 18 (be it an the enclosure 25 with, without, or replaced by additional structures) acts to prevent or at least limit moisture, humidity, and airflow from the relatively lower cooling environment 22 from directly or readily mixing with the relatively upper cooling environment 20. The blocking device 18 also prevents or at least limits airflow from relatively upper cooling environment 20 from entering relatively lower cooling environment 22 in order to fluidly separate desired convective flow.

It should be appreciated that fluid separation or substantial separation is desirable to the system 2 in that some levels of fluid communication between the upper cooling environment 20 and lower cooling environment 22 could cause conductive fluid accumulation (such as water or other liquids) in the upper environment 20 and on the upper surface of the belt 11. This could be problematic in that water accumulation on the upper surface 11 may result in slipping of gum 3 being transported thereon, an increase in relative humidity within relative upper cooling environment 20, reduced heat transfer, buildup of gum on belt 4, increased cleaning and maintenance, and wicking or migration of water. Notably however, the lower surface 10 of the belt 4 may travel through the lower environment 22 and the upper surface 11 of the belt 11 may travel through the upper environment 20 without creating such conditions at unacceptable levels. Further, the belt 4 travel and turn/rotate about conveying wheels outside of the tunnel, thereby exposing the belt to ambient environment without undesirable effect.

Referring now in more detail to the convective cooling system 13, it is noted that the convective cooling system 13 is configured to expedite and more effectively cool chewing gum 3 by providing supplemental cooling in addition to conductive cooling system 9. Particularly, the combination of convective and conductive cooling allows for a one-pass cooling tunnel 2 to effectively cool the chewing gum 3 to a desired temperature without multiple passes or an undesirable residence time.

Convective cooling system 13 is configured to directly interface with a relatively upper cooling environment 20 and chewing gum 3. Convective cooling system 13 utilizes at least one fan 14 to force fluid over chewing gum 3 to transfer heat from the chewing gum 3 and effectively cooling the chewing gum 3 to a desired temperature fluid flow 15. In an exemplary embodiment, the convective fluid flow 15 is air.

Figure 3:
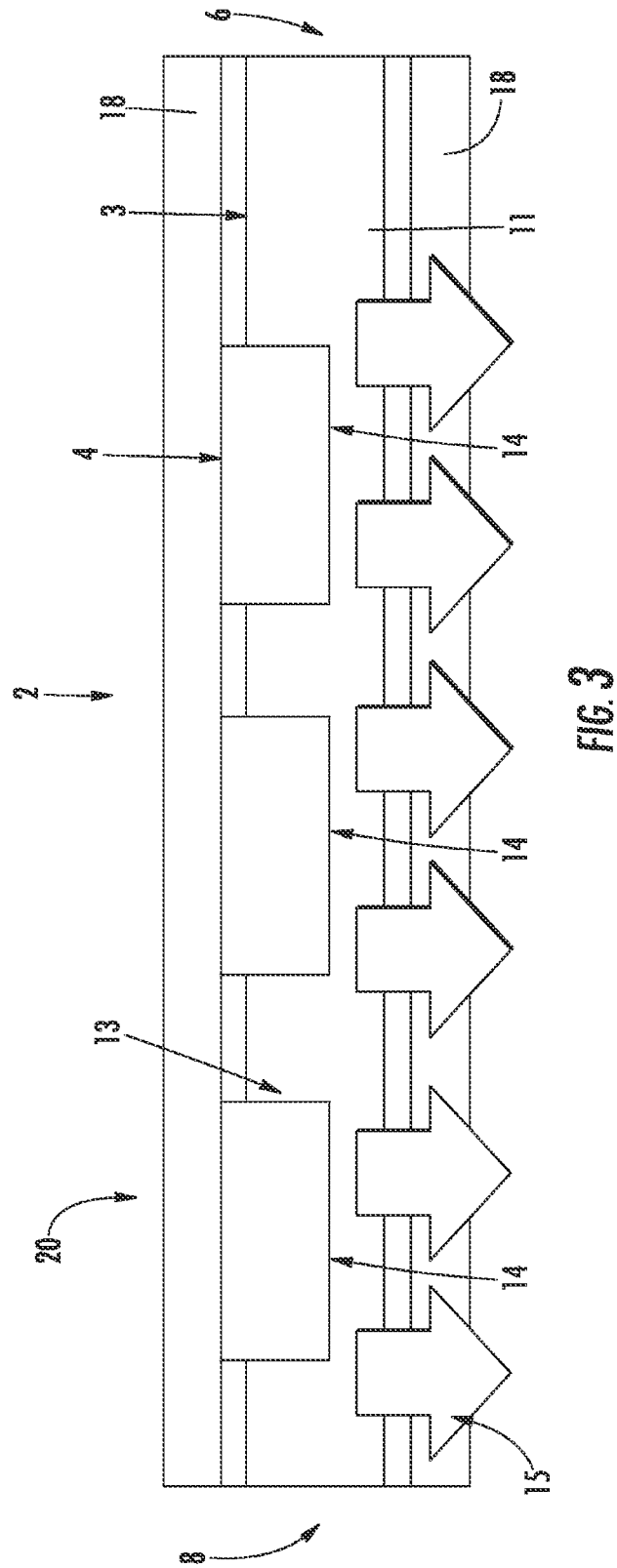
FIG. 3 is a schematic partial plan view illustrating convective fluid flow in an exemplary embodiment such as that shown in FIG. 1 shown without the cooling housing and plenum.

As shown in FIGS. 1-3, at least one fan 14 is disposed above the path of the chewing gum 3 to force fluid the fluid flow 15 down onto and across the chewing gum 3 and the belt 4. These fans 14 are disposed in a cooling chamber 23 of the cooling tunnel 5, and, in an exemplary embodiment, cause the flow 15 to move in a cyclical pattern (represented by arrows in FIG. 2) within the tunnel 5 into and out of the cooling chamber 23. This cyclical flow 15 will be described hereinbelow.

As is sown best in FIG. 2, fluid is drawn into an upper plenum 29 contained in an upper portion of cooling chamber 23. Fluid is drawn into plenum 29 from inlet 26 (disposed in a wall between the cooling chamber and an evaporation chamber 31, which will be described in greater detail below). Fluid flow 15 moves through the upper plenum 29 to the fans 14 that are disposed in fluid communication therewith. The flow 15 is directed downward by the fans 14 in a direction of conveyor 4 and gum 3 proximate of first lateral edge 35 of the chewing gum 3. When the flow 15 reaches the first edge 35 of the chewing gum 3, it is effectively pulled evenly across the gum 3 and conveyor 4 in a direction perpendicular to flow of the chewing gum 3 through the system 2. This path of the fluid flow 15 across the gum 3 (through what is effectively a lower plenum 16) occurs in response to a relatively low pressure area 33 disposed proximate an opposing lateral edge 37 of the chewing gum 3 (low pressure relative to an area proximate the first lateral edge). In an exemplary embodiment, this low pressure area is created by an exhaust port 28, which is also disposed in the wall between the cooling chamber and an evaporation chamber 31 and exhausts the fluid flow 15 from the cooling chamber 23 into the evaporation chamber 31.

Once in the evaporation chamber 31, the fluid flow passes through an evaporator 32. The evaporator 32 serves to removes heat from the fluid flow 15, and allows the temperature of the flow 15 to be controlled via operating parameters thereof. A supplemental cross flow fan 30 may be utilized to help draw fluid flow 15 through evaporator 32, to supply fluid flow 15 back through the inlet 26 to the plenum 29 and fans 14 to repeat the flow cycle. Cyclical fluid flow 15 may be recycled within a range of 50-99% to maintain cyclical flow 15 within upper cooling environment 20. Blocking device 18 and plenum 16 assist directing the cyclical fluid flow 15 to ensure that cyclical fluid flow 15 only flows above the belt 4 and not below the belt 4.

In an exemplary embodiment, the parallel orientation of the blades of the fans 14 at a desirable height above the belt 4 creates overlapping flow fields from adjacent fans, allowing for more even and predictable cooling performance.

Indeed, the overlapping flow fields emanating from fans disposed in Line above the belt 4 may have significant effects on cooling performance of cooling system 2. As shown in the simulated results of FIG. 4, which employs water as the fluid in the conductive cooling system 9 and air as the fluid in the convective cooling system 13, the chewing gum 3 exhibits a temperature range of 14 to 27 degrees Celsius contingent on the residence time (ranging from 30 to 120 seconds) of the chewing gum 3 to be cooled. Specifically with a 'rear parallel' configuration of fans, a residence time of 30 seconds resulted in an approximate average chewing gum 3 temperature of 27 to 30 degrees Celsius, specifically 28 degrees Celsius, a residence time of 40 seconds resulted in an approximate average chewing gum 3 temperature of 25 to 28 degrees Celsius, specifically 26 degrees Celsius, a residence time of 60 seconds resulted in an approximate average chewing gum 3 temperature of 20 to 23 degrees Celsius, specifically 22 degrees Celsius, and a residence time of 120 seconds resulted in an approximate average chewing gum 3 temperature of 12 to 15 degrees Celsius, specifically 13.5 degrees Celsius.

Figure 5:
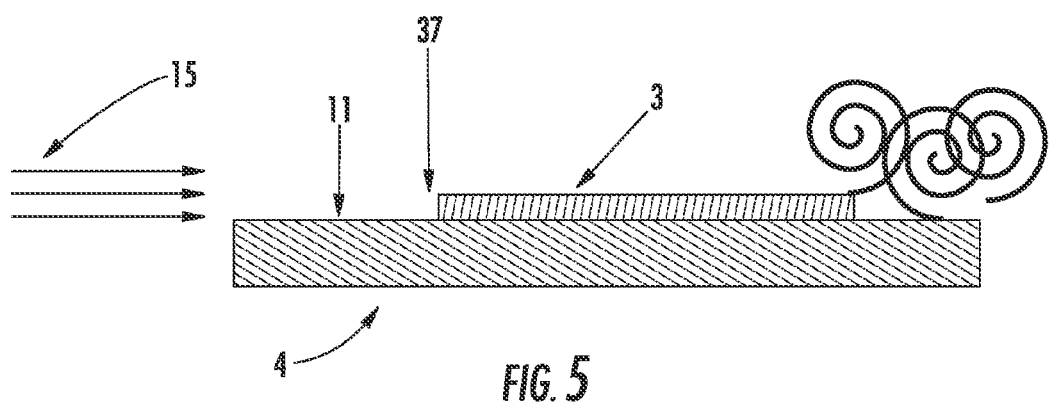
FIG. 5 is a diagrammatic representation of a sheet of chewing gum on a belt.
Figure 6:
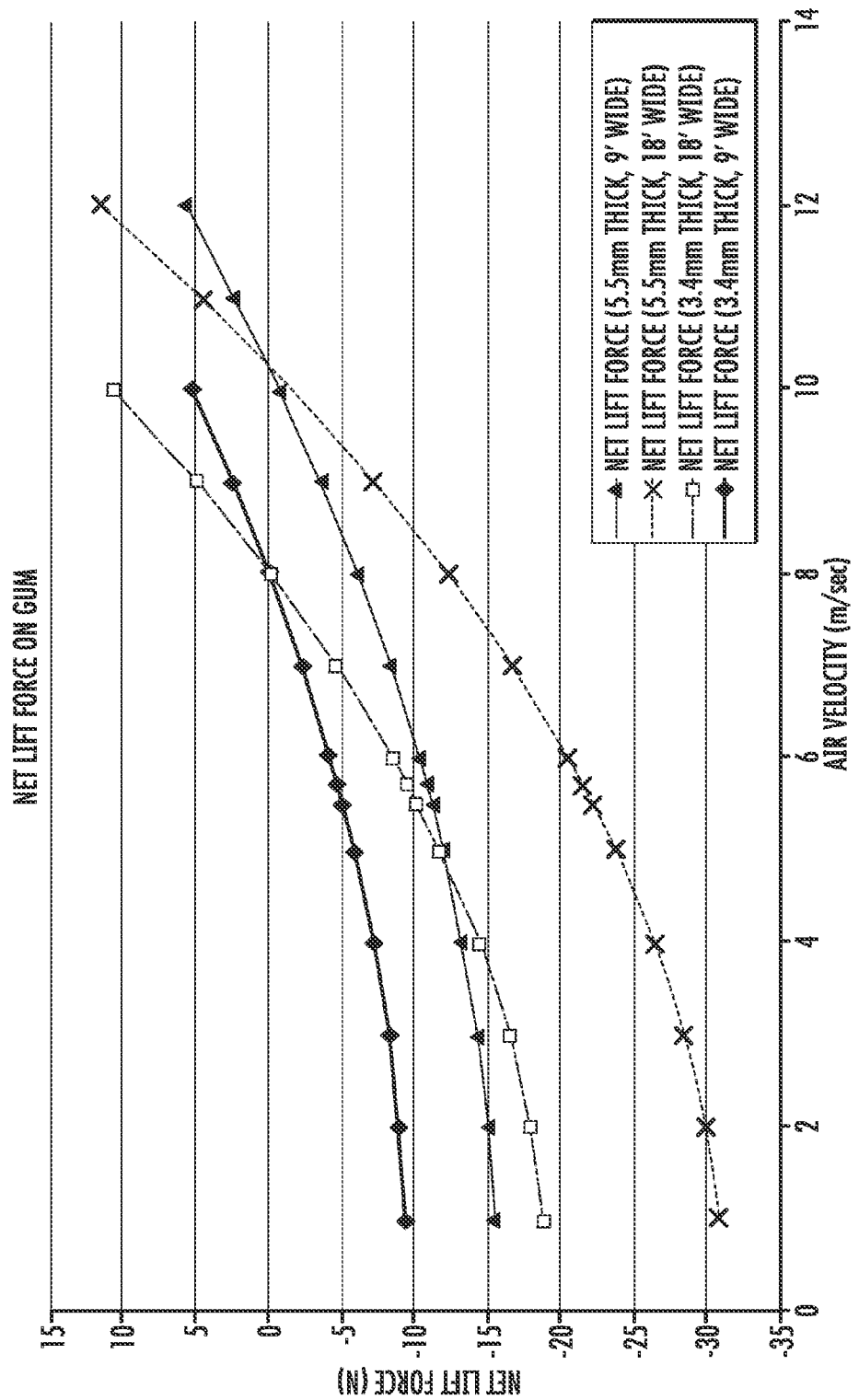
FIG. 6 is a chart illustrating the simulated effect of air velocity on lift for chewing gum.

As is mentioned above, the fluid flow 15 is directed form the fans down towards a first edge of the chewing gum 3. In FIGS. 5 and 7-9, this edge is labeled as edge 35. If, as shown in FIG. 5, the fluid flow 15 arrives at a vertical gum level at an area outside of the lateral edge 35 of the gum 3 a turbulent fluid flow 17 may be created behind the leading edge 35, creating an overall net lifting force. An overall net lift force experienced by chewing gum 3 may limit the maximum speed of the fluid flow 15 over the chewing gum 3, thereby limiting the maximum effective cooling. As shown in the simulated results of FIG. 6, there is a strong relationship between the airspeed and the net lifting force. For example, for chewing gum sheets 3 that are 3.4 mm thick and 9 inches wide, the chewing gum sheet 3 experiences −12 to −7 Newtons (specifically −9 Newtons) net lift force when subjected to an air velocity of 0 to 2 meters per second (specifically 1 meter per second), while the same chewing gum sheet 3 experiences 3 to 8 Newtons (specifically 5 Newtons) net lift force when subjected to an air velocity of 7 to 12 meters per second (specifically 10 meters per second). For chewing gum sheets 3 that are 5.5 mm thick and 9 inches wide, the chewing gum sheet 3 experiences −18 to −13 Newtons (specifically −15 Newtons) net lift force when subjected to an air velocity of 0 to 2 meters per second (specifically 1 meter per second), while the same chewing gum sheet 3 experiences 3 to 8 Newtons (specifically 5 Newtons) net lift force when subjected to an air velocity of 9 to 14 meters per second (specifically 12 meters per second). For chewing gum sheets 3 that are 3.4 mm thick and 18 inches wide, the chewing gum sheet 3 experiences −22 to −15 Newtons (specifically −18 Newtons) net lift force when subjected to an air velocity of 0 to 2 meters per second (specifically 1 meter per second), while the same chewing gum sheet 3 experiences 7 to 12 Newtons (specifically 10 Newtons) net lift force when subjected to an air velocity of 7 to 12 meters per second (specifically 10 meters per second). For chewing gum sheets 3 that are 5.5 mm thick and 18 inches wide, the chewing gum sheet 3 experiences −33 to −28 Newtons (specifically −31 Newtons) net lift force when subjected to an air velocity of 0 to 2 meters per second (specifically 1 meter per second), while the same chewing gum sheet 3 experiences 8 to 13 Newtons (specifically 11 Newtons) net lift force when subjected to an air velocity of 9 to 14 meters per second (specifically 12 meters per second).

Figure 7:
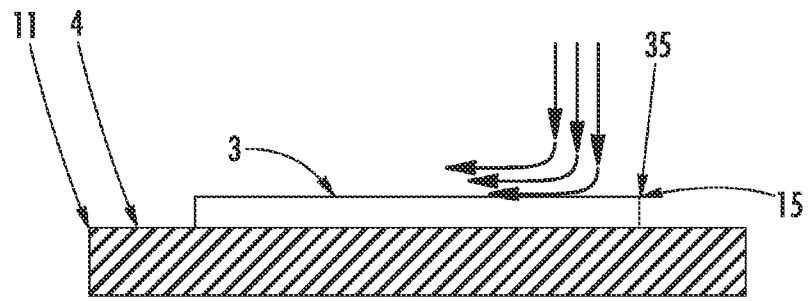
FIG. 7 is a diagrammatic representation of a sheet of chewing gum on a belt.
Figure 8:
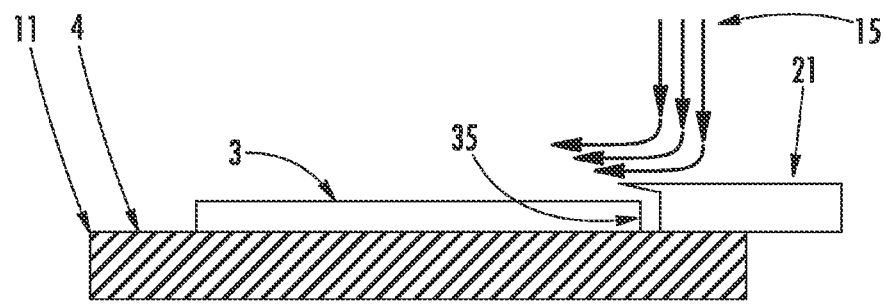
FIG. 8 is a diagrammatic representation of a sheet of chewing gum on a belt.
Figure 9:
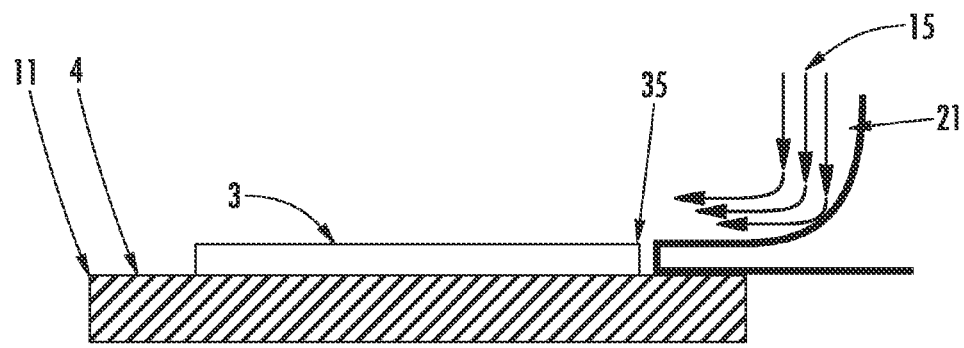
FIG. 9 is a diagrammatic representation of a sheet of chewing gum on a belt.

Accordingly, as shown in FIGS. 7-9 lifting force acting on the chewing gum 3 may be minimized without reducing (or alternatively increasing) the maximum speed of fluid flow 15 in various ways. For example, and as shown in FIG. 7, the fluid flow 15 may be directed to arrive at the gum 3 at an area inside the edge 35 of chewing gum 3 in order to avoid creating the turbulent flow behind the edge 35 of the gum 3 (as shown in FIG. 5). Flow arriving in this area inside of the edge 35 further creates a generally compressive force on the chewing gum 3, which further negates any potential lifting force and actually improves heat transfer between the gum 3 and the belt 4.

FIGS. 8 and 9 also show a gum alignment device 21 that may be altered in various ways to direct fluid flow 15 smoothly over the edge of chewing gum 3 in order to mitigate any potential lifting forces that may occur.

Figure 10:
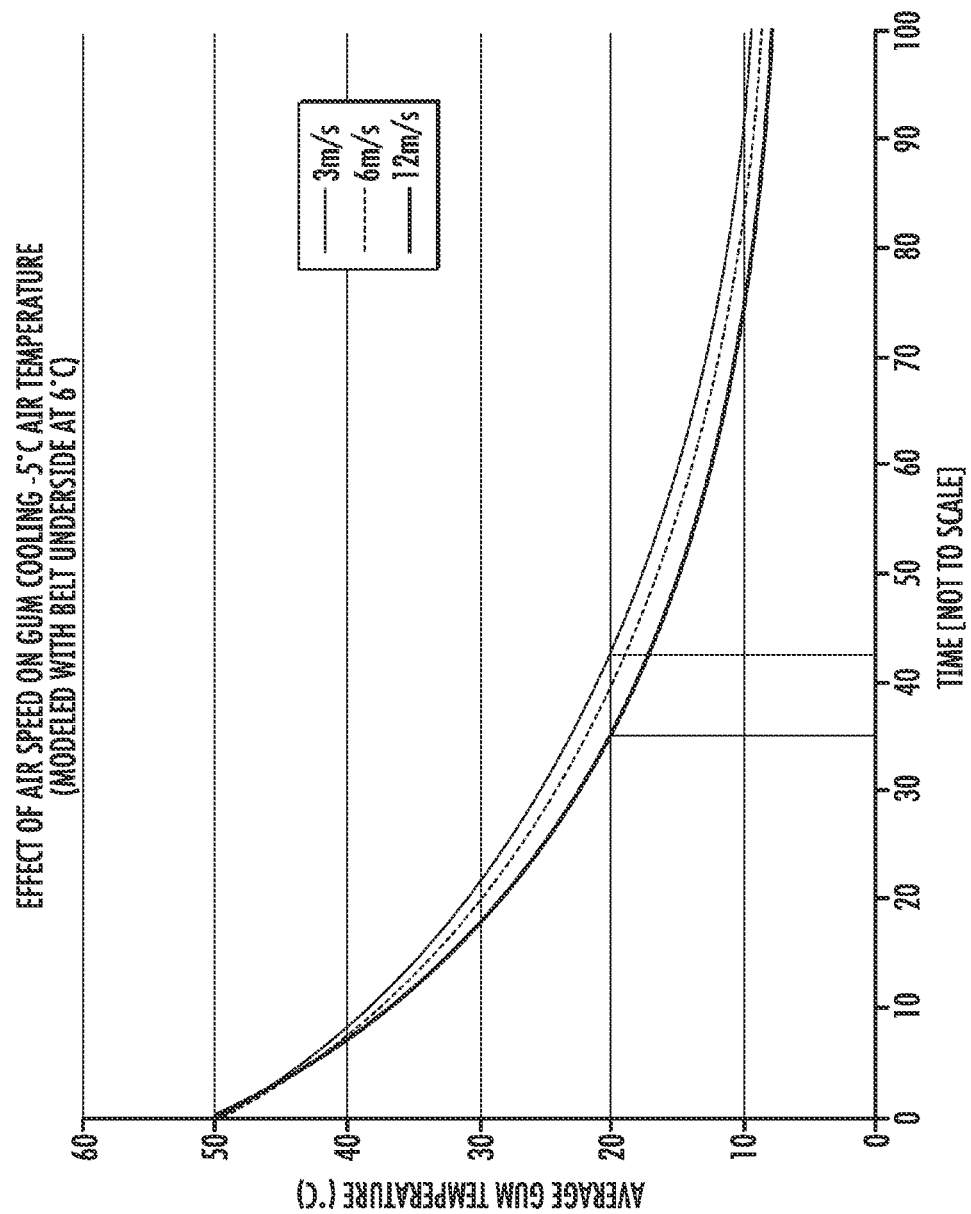
FIG. 10 is a chart illustrating the simulated effect of air speed on chewing gum cooling.

With the elements of the system 10 having been discussed above, some simulated results illustrated in FIGS. 10-16, as well as benefits achieved via the cooling system 2 will be discussed hereinbelow. With reference first to the simulated results of FIG. 10, the fluid, particularly air, speed generated by the fans 14 and convective cooling system 13 within the relatively upper cooling environment 20 will affect the temperature of the chewing gum 3 on belt 4. However, it is to be noted that the average chewing gum 3 temperature varies with the residence time as well. In the following example, water is used as the fluid in the conductive cooling system 9 and air is used as the fluid in the convective cooling system 13. For example, for chewing gum 3 cooled for 34 to 36 seconds (specifically 35 seconds) with a 5 degree Celsius air temperature, at an air speed of 3 meters per second chewing gum 3 will be cooled to 23 to 25 degrees Celsius (specifically 24 degrees Celsius), at an air speed of 6 meters per second chewing gum 3 will be cooled to 21 to 23 degrees Celsius (specifically 22 degrees Celsius), and at an air speed of 12 meters per second chewing gum 3 will be cooled to 19 to 21 degrees Celsius (specifically 24 degrees Celsius). Further, for chewing gum 3 cooled for 41 to 43 seconds (specifically 42 seconds) with a 5 degree Celsius air temperature, at an air speed of 3 meters per second chewing gum 3 will be cooled to 19 to 21 degrees Celsius (specifically 20 degrees Celsius), at an air speed of 6 meters per second chewing gum 3 will be cooled to 18 to 20 degrees Celsius (specifically 19 degrees Celsius), and at an air speed of 12 meters per second chewing gum 3 will be cooled to 16 to 18 degrees Celsius (specifically 17 degrees Celsius). While generally a faster air speed will result in a cooler chewing gum 3 temperature, it is to be noted for extremely long and extremely short residence times, the effects of air velocity on average chewing gum 3 temperature are reduced. For example, for extremely short residence times (0-5 seconds) there may be no discernible effect to the average chewing gum 3 temperature for various air speeds ranging from 3 to 12 meters per second. Similarly, for extremely long residence times (over 100 seconds), there may be no discernible effect to the average chewing gum 3 temperature for various air speeds ranging from 3 to 12 meters per second.

Figure 11:
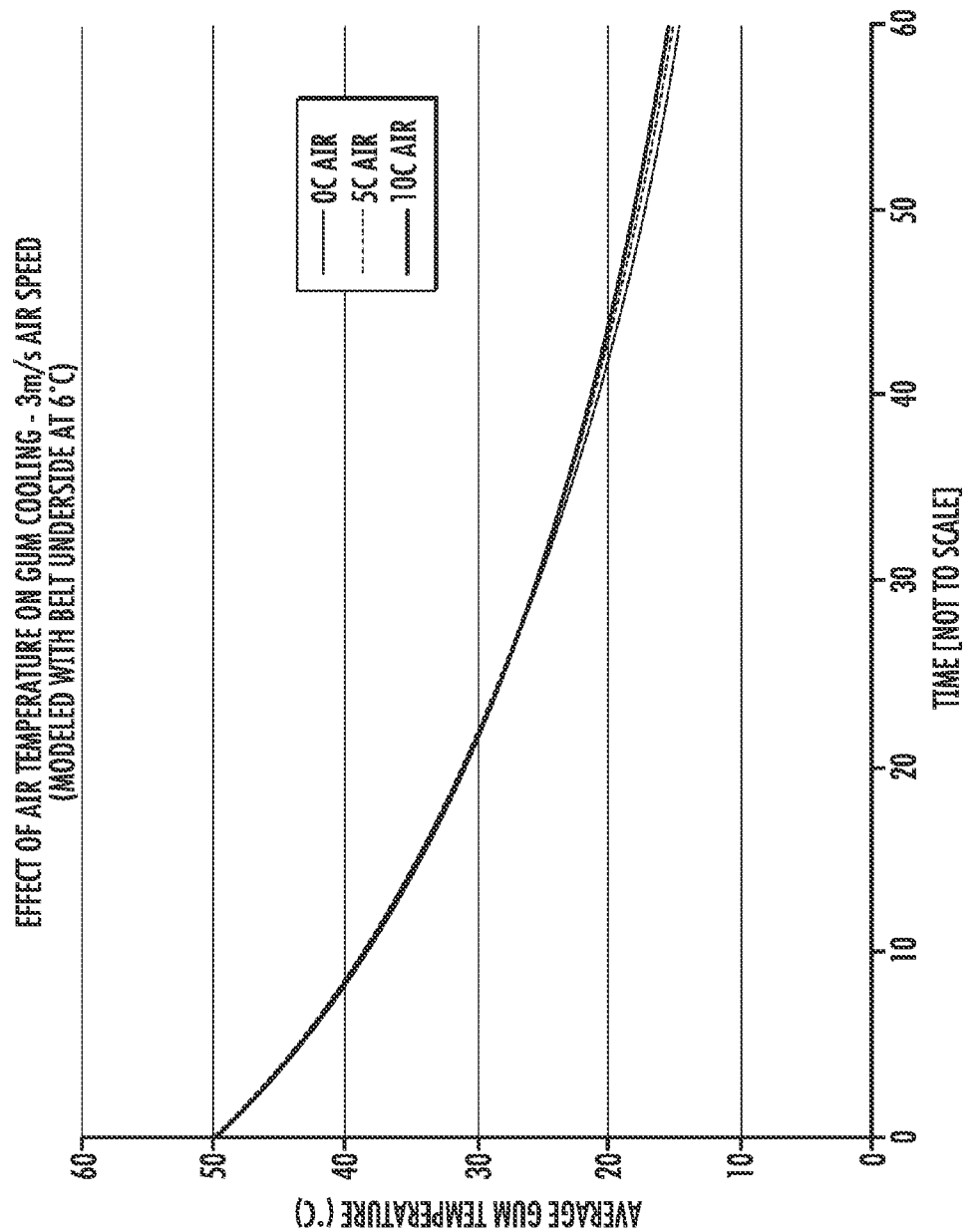
FIG. 11 is a chart illustrating the simulated effect of convective cooling air temperature on chewing gum cooling.

Referring now to FIG. 11, and as mentioned above with regards to evaporator 32, the temperature of the fluid, particularly air, delivered by the convective cooling system 13 may be adjusted for desired results. However, as shown in FIG. 11, the convective fluid, particularly air, temperature may not have a strong effect on the average chewing gum 3 temperature for any given time. In the following example, water is used as the fluid in the conductive cooling system 9 and air is used as the fluid in the convective cooling system 13. For example, for chewing gum 3 cooled at an air speed of 3 meters per second the difference for average chewing gum temperature between an air temperature of 0 degrees Celsius and an air temperature of 10 degrees Celsius for 30 seconds is negligible. It is noted for longer residence times (greater than 60 seconds) the difference in average chewing gum 3 temperature begins to increase. Accordingly, the air temperature of the convective cooling system 13 and the relatively upper cooling environment 20 may be adjusted to approximately match the temperature of the cooling temperature of the conductive cooling system 9. The benefit of a similar or identical temperature is the lower incidence of moisture within the relatively upper cooling environment 20, exposing the chewing gum 3 to lower levels of moisture.

Figure 12:
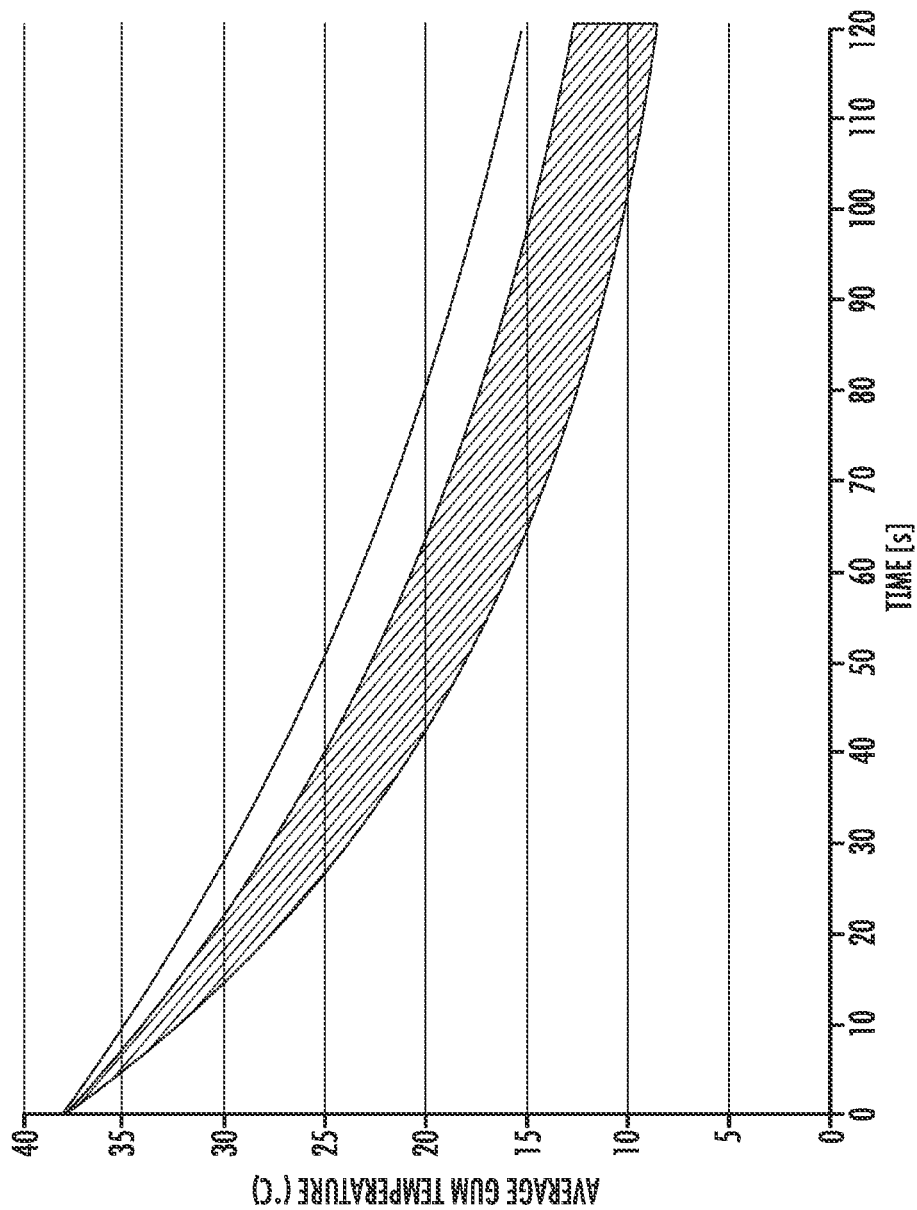
FIG. 12 is a chart comparing the simulated effect of adding supplemental convective cooling to chewing gum cooled via conductive cooling.
Figure 13:
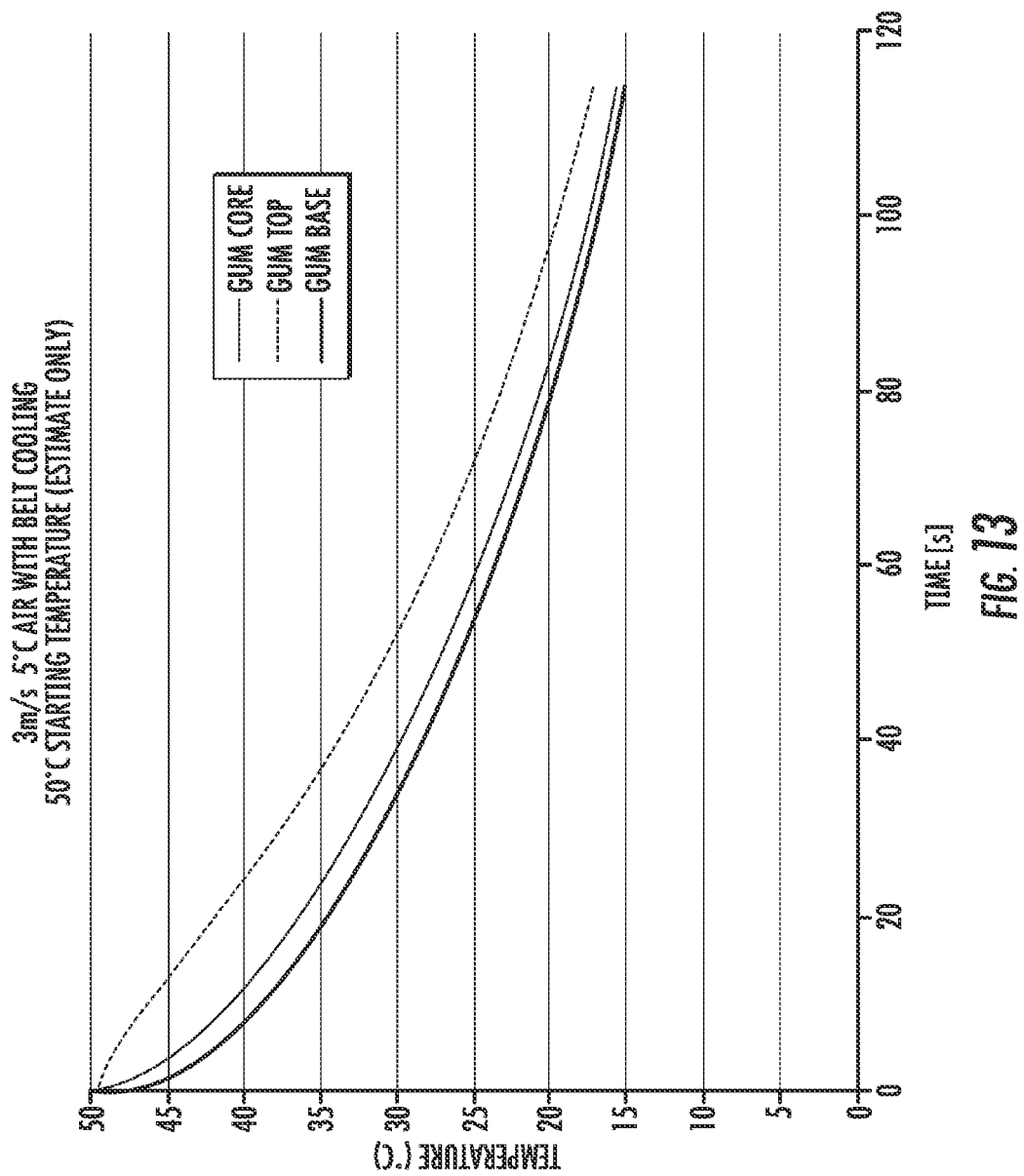
FIG. 13 is a chart comparing the simulated temperature of chewing gum over time at the core, top and base of the chewing gum.
Figure 14:
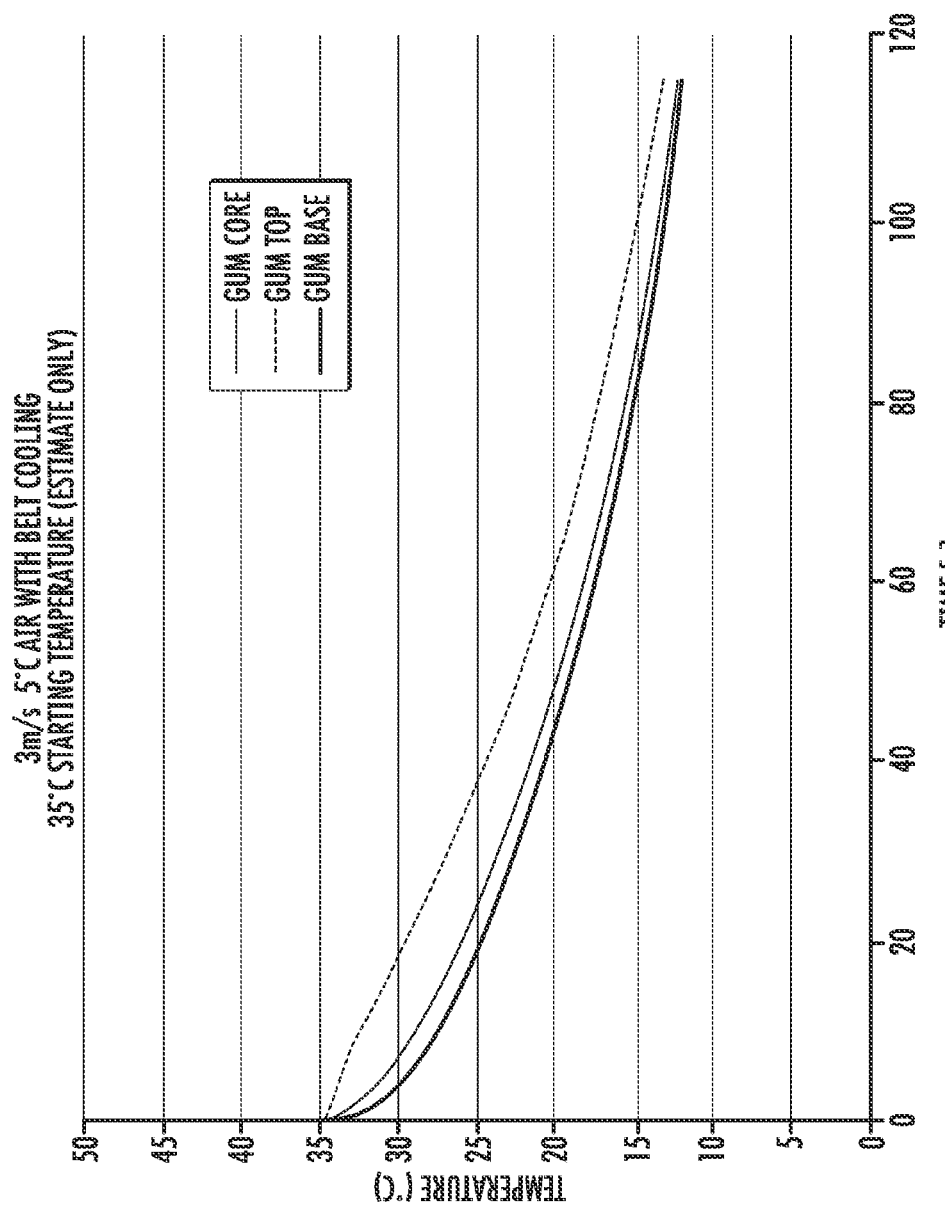
FIG. 14 is a chart comparing the simulated temperature of chewing gum over time at the core, top and base of the chewing gum.
Figure 15:
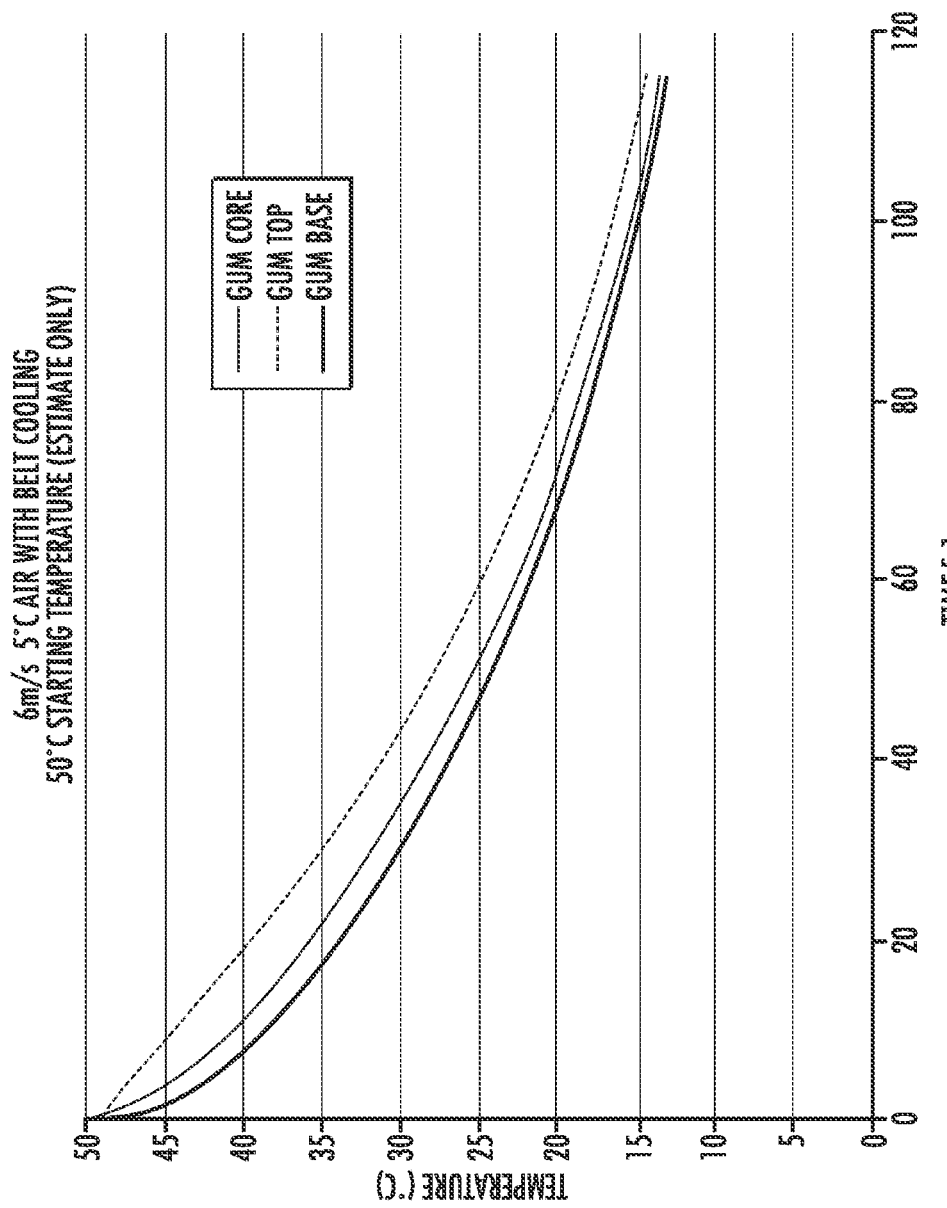
FIG. 15 is a chart comparing the simulated temperature of chewing gum over time at the core, top and base of the chewing gum.
Figure 16:
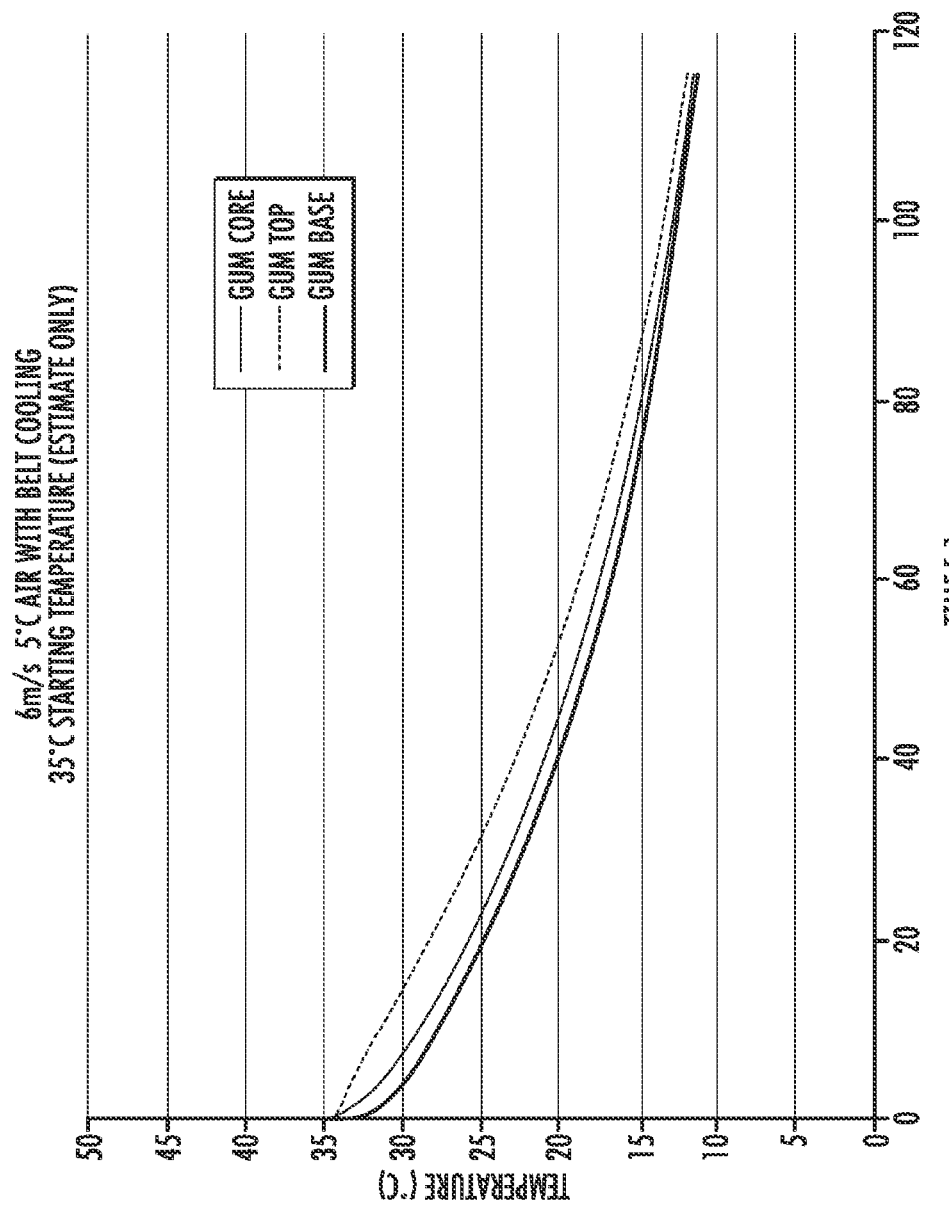
FIG. 16 is a chart comparing the simulated temperature of the chewing gum over time at the core, top and base of the chewing gum.

As shown in the simulated results of FIG. 12, supplemental convective cooling in addition to conductive cooling allows for improved cooling performance for chewing gum 3 in cooling tunnel 2 compared to conductive cooling alone. In certain embodiments, 60%-80% of total cooling may be conductive, while 20%-40% may be convective. In at least one example, 70% of total cooling may be conductive, while 30% may be convective. In an alternative embodiment, greater than 50% of total cooling may be conductive, while less than 50% may be convective. In the following example, water is used as the fluid in the conductive cooling system 9 and air is used as the fluid in the convective cooling system 13. In FIG. 12, the solid line shows the average chewing gum 3 temperature compared to residence time when cooled by a conductive system alone, while the shaded portion region shows the range of average chewing gum 3 temperatures possible for chewing gum 3 cooled by conductive and convective systems at various air speeds. For example, for a residence time of 60 seconds, the average chewing gum 3 temperature may be 3 to 7 degrees Celsius cooler with both conductive and convective cooling systems compared to conductive cooling systems alone. Specifically, for a residence time of 60 seconds, the average chewing gum 3 temperature for chewing gum 3 cooled via conduction alone is 22 to 24 degrees Celsius (specifically 23 degrees Celsius), while the average chewing gum 3 temperature for chewing gum 3 cooled via conduction and convection is 16 to 20 degrees Celsius. While cooling system 2 allows for improved cooling performance, the performance parameters of cooling system 2 may be adjusted for each application. Particularly, the temperatures of the convective cooling system 13 and the conductive cooling system 9 may be adjusted for the desired application.

Further, compared to conventional single pass cooling tunnels, cooling system 2 allows for greater space efficiency. In addition to improved cooling performance, supplemental convective cooling allows for greater cooling in a shorter length cooling system 2. Compared to conventional cooling tunnels, cooling system 2 is able to cool chewing gum 3 with a greater temperature drop per length of cooling tunnel 2 compared to conventional single pass cooling tunnels (for a given a same conveying speed).

Referring now to FIGS. 13-16, the temperatures of the chewing gum 3 at the top, core, and bottom when cooled by a single pass cooling tunnel 2 with both conductive and convective cooling are illustrated. Generally, a cooling tunnel 2 utilizing both conductive and convective cooling allows for the chewing gum 3 to be cooled more evenly across the top, core, and bottom of the chewing gum 3 compared to chewing gum 3 cooled by conductive cooling alone. In the following examples, water is used as the fluid in the conductive cooling system 9 and air is used as the fluid in the convective cooling system 13. For example, referring to the simulated results of FIG. 13, for chewing gum 3 having a 50 degree Celsius starting temperature, cooled by conduction and convection, with the air temperature of 5 degrees Celsius and an air speed of 3 meters per second, after a residence time of 60 seconds, the top of the chewing gum 3 has a temperature of 26 to 28 degrees Celsius (specifically 27 degrees Celsius), the core of the chewing gum 3 has a temperature of 23 to 25 degrees Celsius (specifically 24 degrees Celsius), and the base of the chewing gum 3 has a temperature of 22 to 24 degrees Celsius (specifically 23 degrees Celsius). Referring to the simulated results of FIG. 14, for chewing gum 3 having a 35 degree Celsius starting temperature, cooled by conduction and convection, with the air temperature of 5 degrees Celsius and an air speed of 3 meters per second, after a residence time of 60 seconds, the top of the chewing gum 3 has a temperature of 19 to 21 degrees Celsius (specifically 20 degrees Celsius), the core of the chewing gum 3 has a temperature of 18 to 20 degrees Celsius (specifically 19 degrees Celsius), and the base of the chewing gum 3 has a temperature of 17 to 19 degrees Celsius (specifically 18 degrees Celsius). Referring to the simulated results of FIG. 15, for chewing gum 3 having a 50 degree Celsius starting temperature, cooled by conduction and convection, with the air temperature of 5 degrees Celsius and an air speed of 6 meters per second, after a residence time of 60 seconds, the top of the chewing gum 3 has a temperature of 25 to 27 degrees Celsius (specifically 26 degrees Celsius), the core of the chewing gum 3 has a temperature of 22 to 24 degrees Celsius (specifically 23 degrees Celsius), and the base of the chewing gum 3 has a temperature of 21 to 23 degrees Celsius (specifically 22 degrees Celsius). Referring to the simulated results of FIG. 16, for chewing gum 3 having a 35 degree Celsius starting temperature, cooled by conduction and convection, with the air temperature of 5 degrees Celsius and an air speed of 6 meters per second, after a residence time of 60 seconds, the top of the chewing gum 3 has a temperature of 17 to 19 degrees Celsius (specifically 18 degrees Celsius), the core of the chewing gum 3 has a temperature of 16 to 18 degrees Celsius (specifically 17 degrees Celsius), and the base of the chewing gum 3 has a temperature of 16 to 18 degrees Celsius (specifically 17 degrees Celsius). It is to be noted that for the examples shown in FIGS. 13-16, the chewing gum 3 top, core, and base temperatures continue to converge with longer residence times.

In addition to cooling chewing gum 3, cooling system 2 may reduce or eliminate damage to chewing gum 3 during the cooling process, as some compositions of chewing gum 3 may also include ingredients that may be damaged by humidity introduced during the cooling process. For example, sorbitol may absorb moisture from the environment when the cooling environment is over 30% humidity, while maltitol may absorb moisture from the environment when the cooling environment is over 40% humidity. Still other chewing gum compositions may absorb moisture from the environment when the cooling environment is over 55% humidity. Absorbed moisture may cause the sheets of chewing gum 3 to decease in hardness, which may lead to lower packaging efficiencies and deformed pellets during the coating process.

In addition to limiting the entry of humidity and moisture into the relatively upper cooling environment 20 via delimiting physical barriers, humidity, moisture, and other contaminants may be impeded from entering the cooling system 2 (particularly relatively upper cooling environment 20) via entry point 6 and exit point 8 by maintaining a relative positive pressure compared to the ambient environment surrounding the cooling system 2. The relative positive pressure may be maintained by any suitable device. In at least one embodiment, the relative positive pressure may be maintained by convective cooling system 13. The convective cooling system 13 may maintain a pressure of higher than atmospheric pressure to ensure that a minimal amount of air (that may contain contaminants and humidity) from outside the cooling system 2 enters the cooling system 2. In at least one embodiment, the convective cooling system 13 may be configured to maintain a pressure greater than one bar within the relatively upper cooling environment 20.

Additionally, humidity may be actively removed from relatively upper cooling environment 20 via a humidity control system 24 that further dehumidifies the air, or other appropriate convective fluid, in relatively upper cooling environment 20. The humidity control system 24 may be a dehumidifier 24, which may be employed to maintain humidity in the housing 5 (particularly the upper cooling environment 20 and cooling chamber 23 containing the gum) at a level that is less than or equal to a dew point of the atmosphere within the housing 5 or the water activity of whatever gum composition is running through the system 2, whichever is lower. An environment with a humidity level above the water activity of a chewing gum will cause moisture to enter the gum, creating undesirable results. Gum compositions tend to have a water activity at or below 0.55 (55%), and more typically at or below 0.4 (40%, typically for compositions including maltitol) or 0.3 (30%, typically for compositions including sorbitol). As such, it is desirable to maintain the humidity at less than 55%, and more desirably less than 40%, 30% or 15-25%.

Humidity may enter the relatively upper cooling environment 20 through the entry 6 and exit 8 of cooling system 2, may be created during the cooling process (even though the temperatures of the conductive cooling system 9 and the convective cooling system 13 may be similar or identical), and from relatively lower cooling environment 22 (even though blocking device 18 may effectively be blocking moisture from the relatively lower cooling environment 22). As a result, dehumidifier 24 in fluid communication with the upper cooling environment may draw a stream of air from airflow 15 or cyclical air flow 15, dehumidify the air, and reintroduce air into airflow 15. Dehumidifier 24 may be disposed outside of cooling tunnel 5 yet fluidly connected to the upper cooling environment 20, further disposed near the middle of the length of the cooling tunnel 2 for even distribution of conditioned air by drawing streams of air from an airflow 15 near the middle of the length of cooling tunnel 5.

In at least one embodiment, the humidity control system 24 may maintain the cooling tunnel 2 and the relatively upper cooling environment 22 at less than 30% to 40% humidity, and further ensure the dew point within the relatively upper cooling environment 20 is below the temperature of the relatively upper cooling environment 20, gum 3, or conveying device 4. Alternatively, humidity control system 24 may be configured to have the appropriate size and capacity to ensure that the dew point and humidity are sufficiently low, and generally, moisture does not form within relatively upper cooling environment 20, or on gum 3 and conveying device 4. As discussed previously, this prevents undesirable effects within the chewing gum 3, including undesirable texture and packaging difficulties.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for cooling chewing gum, the system comprising:
   a chewing gum;
   a cooling housing including a relatively upper cooling environment including an upper cooling chamber and a relatively lower cooling environment including a lower cooling chamber;
   a conveying device configured to convey the chewing gum from an entry point to an exit point of said cooling housing, said conveying device at least partially delimiting said relatively upper cooling environment from said relatively lower cooling environment;
   a first cooling system configured to provide cooling output to said upper cooling chamber of said relatively upper cooling environment using a first cooling fluid provided from a first cooling fluid source, said first cooling fluid being air and said first cooling system including a convective cooling system having at least one fan for moving said air across the chewing gum in a direction perpendicular to a flow of the chewing gum, wherein a face of said at least one fan is oriented parallel to said conveying device;
   a plenum configured to direct a cyclical flow of said air cycling between said at least one fan and an evaporator
   a second cooling system configured to provide cooling output to said lower cooling chamber of said relatively lower cooling environment using a second cooling fluid provided from a second cooling fluid source, said second cooling fluid source being different than said first cooling fluid source, second cooling fluid being a liquid, wherein said second cooling fluid source is at least one cooling jet positioned to spray said second cooling fluid to a lower surface of said conveying device,
   a blocking device configured to fluidly separate said upper cooling environment and said lower cooling environment, wherein said blocking device comprises an enclosure surrounding said second cooling system;

said enclosure being defined at an upper portion by a stationary structure carrying said conveying device and by said conveying device itself, thereby allowing said at least one cooling jet direct access to said lower surface of said conveying device, wherein said blocking device further comprises a gasket structure extending laterally from inner walls of said cooling housing to a portion of said conveying device.

2. The system of claim 1, wherein said first cooling system is a convective cooling system and said second cooling system is a conductive cooling system.

3. The system of claim 1, wherein said upper cooling environment has a pressure greater than atmospheric pressure.

4. The system of claim 1, further comprising a dehumidifier fluidly connected to said upper cooling environment configured to lower a dew point below a temperature of said upper cooling environment.

5. The system of claim 1, wherein a fluid from said first cooling system is directed to apply a compressive force to the chewing gum.

6. The system of claim 1, including a gum alignment device arranged adjacent an edge of the chewing gum, wherein a configuration of the gum alignment device reduces any lifting force acting on the chewing gum by directing a fluid flow across the chewing gum.

7. The system of claim 1, wherein the chewing gum is not conducive to turning or bending back upon itself due to the chewing gum being at least one of:

friable;

multitextural;

inclusive of a non-uniform surface texture; and absent dusted compositions.

* * * * *